United States Patent
Jang et al.

(10) Patent No.: US 8,200,162 B2
(45) Date of Patent: Jun. 12, 2012

(54) SYSTEM AND METHOD FOR MINIMIZING INTERFERENCE BETWEEN RFID READER

(75) Inventors: Hyun-Min Jang, Gyeonggi-do (KR); O-Hyon Kwon, Seoul (KR); Su-Kil Kang, Gyeonggi-do (KR); Tae-Jin Shin, Seoul (KR)

(73) Assignee: SK Telecom Co., Ltd. (KR)

( * ) Notice: Subject to any disclaimer, the term of this patent is extended or adjusted under 35 U.S.C. 154(b) by 384 days.

(21) Appl. No.: 12/160,911

(22) PCT Filed: Jan. 8, 2008

(86) PCT No.: PCT/KR2008/000102
§ 371 (c)(1),
(2), (4) Date: Oct. 8, 2008

(87) PCT Pub. No.: WO2008/084958
PCT Pub. Date: Jul. 17, 2008

(65) Prior Publication Data
US 2009/0305637 A1   Dec. 10, 2009

(30) Foreign Application Priority Data
Jan. 8, 2007   (KR) .................. 10-2007-0002124

(51) Int. Cl.
*H04B 17/00* (2006.01)
(52) U.S. Cl. ............... 455/67.11; 455/63.1; 455/41.2
(58) Field of Classification Search ............. 455/63.1, 455/67.11, 41.2
See application file for complete search history.

(56) References Cited

U.S. PATENT DOCUMENTS
| 5,677,909 A * | 10/1997 | Heide ............... 370/347 |
| 6,807,165 B2 | 10/2004 | Belcea |
| 2005/0088284 A1 * | 4/2005 | Zai et al. ............... 340/10.2 |

FOREIGN PATENT DOCUMENTS
KR   10-2005-0108694   11/2005

* cited by examiner

*Primary Examiner* — Yuwen Pan
(74) *Attorney, Agent, or Firm* — Baker & Hostetler LLP

(57) ABSTRACT

Disclosed is a method for minimizing interference between RFID readers built in a mobile terminal, it is possible to minimize interference between readers by assigning an operating time specific to the mobile terminal at a specific point of time of a cycle of a mobile communication network signal according to an identity number of a mobile terminal, even when several readers are scattered in a predetermined area and they try to detect one tag at the same time.

8 Claims, 2 Drawing Sheets

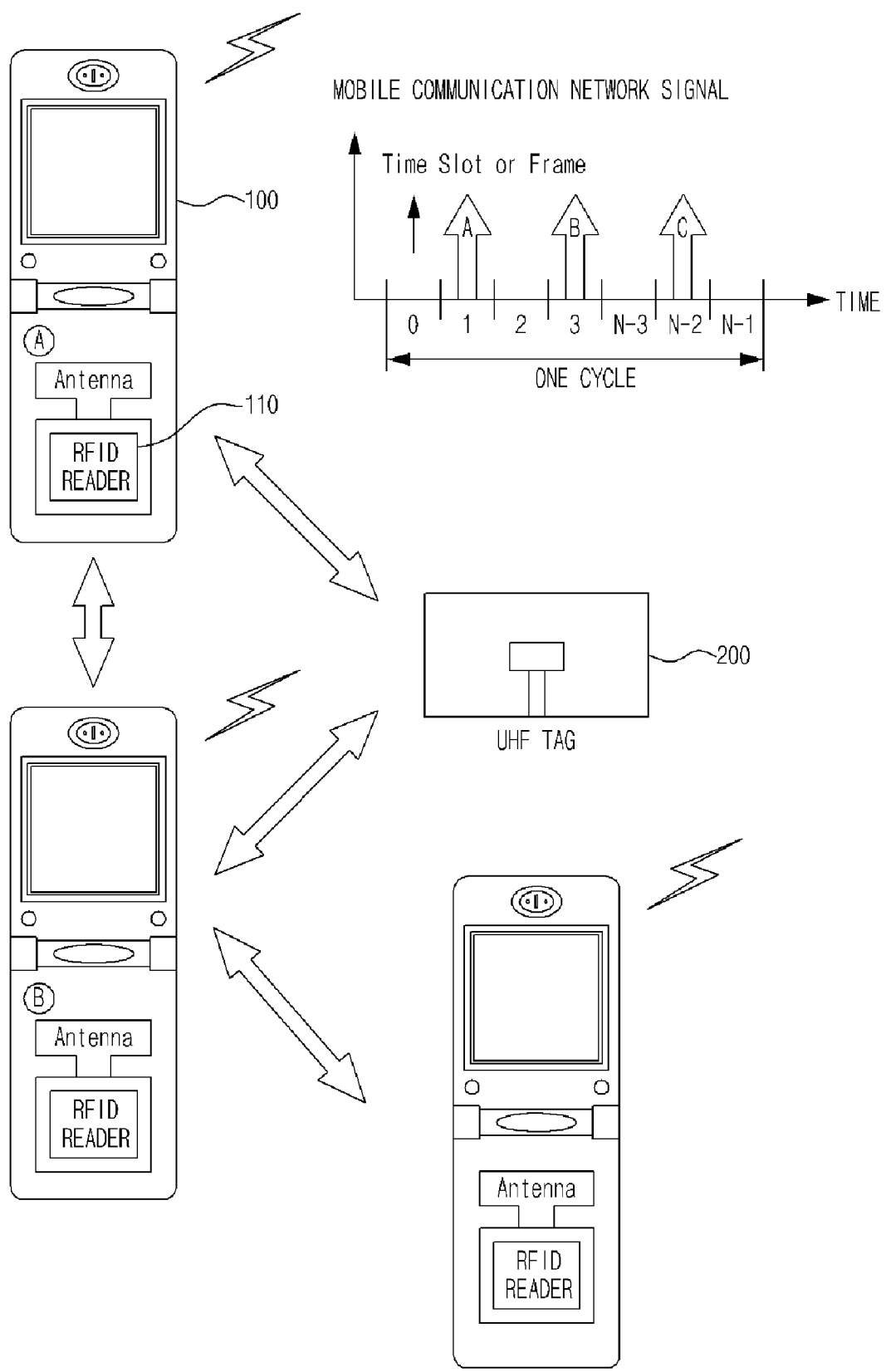
[Fig. 1]

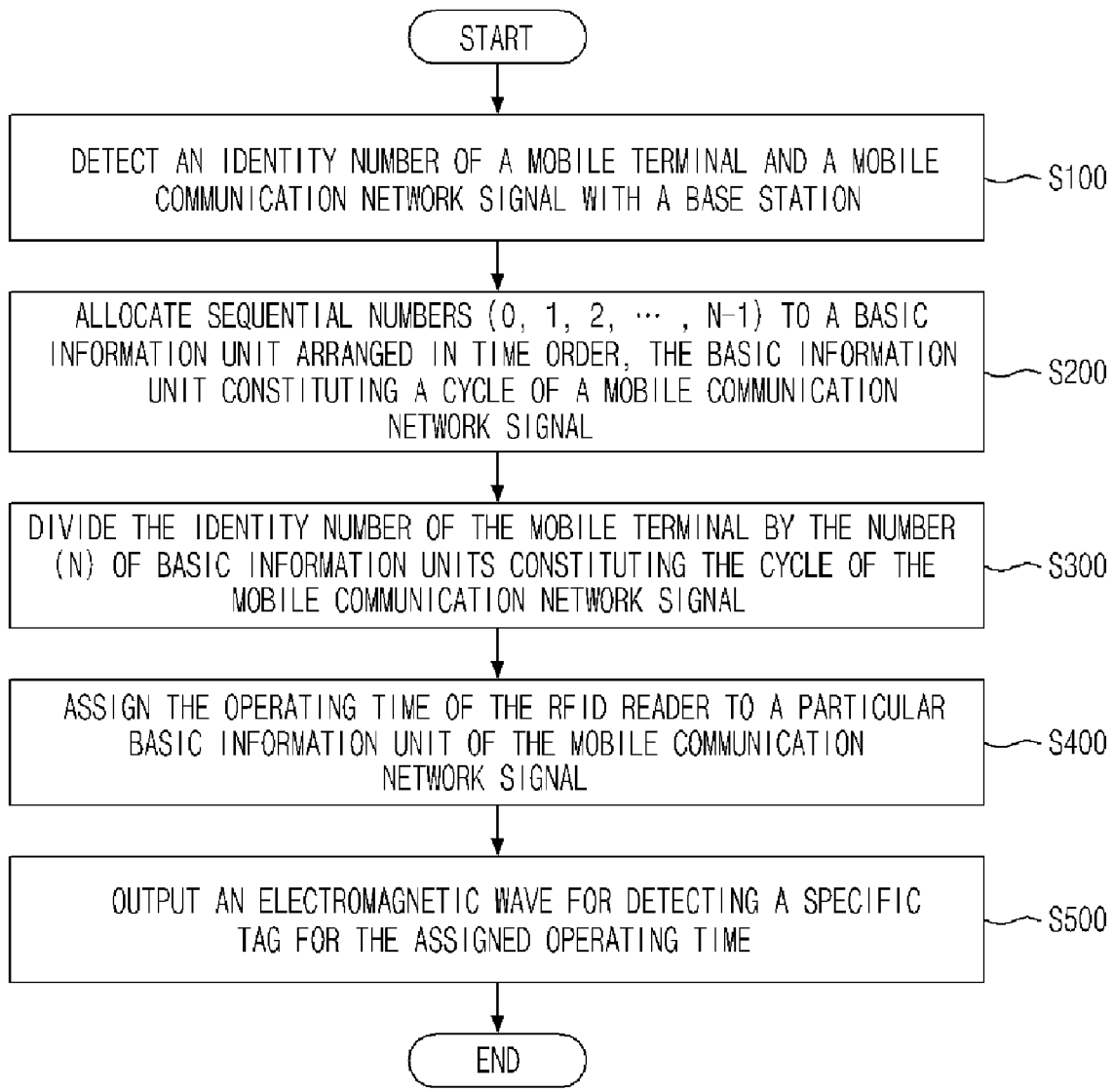

SYSTEM AND METHOD FOR MINIMIZING INTERFERENCE BETWEEN RFID READER

TECHNICAL FIELD

The present invention relates to a system and method for minimizing interference between RFID readers, and more particularly to a system and method for minimizing interference between RFID readers, which minimizes the interference between the RFID readers by scheduling operations of respective RFID readers mounted in a plurality of mobile terminals through a mobile communication network signal including a synchronous signal or an asynchronous signal.

BACKGROUND ART

RFID (Radio Frequency Identification) refers to a technology for reading information from a tag attached to an object by using a radio wave. Such RFID can be applied to various fields such as logistics, security and distribution and the like of objects.

By substituting the existing barcode based contact with an object by RFID, there are advantages in that information can be read at faster speed than that in the barcode, the distance limit of operation environment can be mitigated, objects can be endowed with intelligences.

With regard to this, a reader for recognizing the RFID tag has recently been mounted in a personal mobile terminal, such that the RFID technology is gradually in the trend of personalization and diversification.

Meanwhile, a conventional mobile phone with a built-in RFID reader radiates an electromagnetic wave so as to detect a tag. When several readers are scattered around a specific tag and simultaneously try to detect the specific tag, there occurs a problem in that a tag detecting operation cannot be normally performed because electromagnetic waves radiated from RFID readers are affected by each other.

With regard to this, technologies, such as "ALOHA", "Slotted ALOHA", "Frame Slotted ALOHA", and "Adaptive Frame Slotted ALOHA" etc., have been conventionally applied to RFID readers in order to minimize the mentioned interference among readers. However, such conventional technologies cannot reliably solve interference among readers.

DISCLOSURE

Technical Problem

Accordingly, the present invention has been made to solve the above-mentioned problems occurring in the prior art, and the present invention provides a system and method for minimizing interference between RFID readers, which minimizes the interference between the RFID readers by scheduling each operation of RFID readers mounted in a plurality of mobile terminals through a mobile communication network signal including a synchronous signal or an asynchronous signal.

Technical Solution

In accordance with an aspect of the present invention, there is provided a method for minimizing interference of an RFID reader built in a mobile terminal, the method including the steps of: a) detecting an identity number of the mobile terminal and a mobile communication network signal for synchronizing the mobile terminal with a base station; b) allocating sequential identification numbers $(0, 1, 2, \ldots, N-1)$ to basic information units constituting a cycle of the mobile communication network signal, the basic information units arranged in time order; c) dividing the identity number of the mobile terminal by the number (N) of basic information units constituting the cycle of the mobile communication network signal; d) assigning an operating time of the reader to a particular basic information unit of the mobile communication network signal allocated the identification number identical to a remainder of the identity number of the mobile terminal, the identity number divided by the number of the basic information units; and e) outputting an electromagnetic wave for detecting a specific tag during the assigned operating time.

In the configuration above, the identity number of the mobile terminal includes one of MDN, MIN, ESN, and MSISDN for identifying the mobile terminal.

In the configuration above, the cycle of the mobile communication network signal is constituted by a plurality of slots or frames arranged in time order.

In accordance with another aspect of the present invention, there is provided a system for minimizing interference between RFID readers, the system detecting an identity number of a mobile terminal and a mobile communication network signal having a predetermined cycle for synchronizing the mobile terminal with a base station; assigning an operating time of an RFID reader built in the mobile terminal during a particular basic information unit among basic information units arranged in time order so as to constitute a cycle of the mobile communication network signal based on the identity number; and radiating an electromagnetic wave for detecting a tag only for the assigned operating time.

In the configuration above, the mobile terminal allocates sequential identification numbers $(0, 1, 2, \ldots, N-1)$ to basic information units arranged in time order, the basic information unit constituting a cycle of the mobile communication network signal; divides the identity number of the mobile terminal by the number (N) of basic information units constituting the cycle of the mobile communication network signal, and assigns the operating time to a particular basic information unit allocated the identification number identical to the remainder of the divided identity number of the mobile terminal.

In the configuration above, the identity number of the mobile terminal includes one of MDN, MIN, ESN, and MSISDN for identifying the mobile terminal.

In the configuration above, the cycle of the mobile communication network signal is constituted by a plurality of slots or frames arranged in time order.

In the configuration above, the mobile terminal controls the operation of the RFID reader through a built-in host MCU.

ADVANTAGEOUS EFFECTS

In regards to a method for minimizing interference between RFID readers according to the present invention, it is possible to minimize interference between readers by assigning an operating time specific to the mobile terminal at a specific point of time of a cycle of a mobile communication network signal according to an identity number of a mobile terminal, even when several readers are scattered in a predetermined area and they try to detect one tag at the same time.

DESCRIPTION OF DRAWINGS

The foregoing and other objects, features and advantages of the present invention will become more apparent from the following detailed description when taken in conjunction with the accompanying drawings in which:

FIG. 1 is a view schematically showing a configuration of a system for minimizing interference between RFID readers according to an embodiment of the present invention; and FIG. 2 is a flowchart schematically showing a method for minimizing interference between RFID readers according to an embodiment of the present invention.

BEST MODE

Hereinafter, exemplary embodiments of the present invention will be described with reference to the accompanying drawings.

FIG. 1 schematically shows a configuration of a system for minimizing interference between RFID readers according to an embodiment of the present invention.

As shown in FIG. 1, a system according to an embodiment of the present invention includes a mobile terminal 100 detecting both its own identity number, i.e., an identity number of the mobile terminal 100 and a mobile communication network signal having a predetermined period for synchronizing the mobile terminal with a base station, assigning an operating time for detecting a tag 200 at a specific time among basic information units arranged in time order so as to constitute a cycle of the mobile communication network signal based on the identity number, and an RFID reader 110 radiating an electromagnetic wave for detecting the tag 200 for the assigned time mentioned above, the RFID reader 110 built in the mobile terminal. Here, the identity number of the mobile terminal 100 corresponds to one of numbers, such as MDN, MIN, ESN, MSISDN, etc., which are uniquely allocated thereto, and preferably, any unique numerical information which the mobile terminal has may be used as the identity number. In addition, in a mobile communication network signal having a predetermined cycle for synchronizing the mobile terminal with the base station, one predetermined cycle of the signal is constituted by a plurality of slots or frames arranged in time order.

More particularly, each mobile terminal 100 determines an operation timing of the RFID reader 110 mounted through a built-in modem chip, i.e., a host MCU (not shown). That is, the mobile terminal allocates sequential identification numbers (0, 1, 2, ..., N−1) to slots or frames arranged in time order, wherein the slots or frames constitute a cycle of a mobile communication network signal. The mobile terminal then divides the identity number of the mobile terminal 100 by the number (N) of basic information units constituting the cycle of the mobile communication network signal, and assigns the operating time to a slot or a frame allocated the identification number identical to the remainder of the divided identity number of the mobile terminal 100.

Hence, as operating times A, B and C according to the identity numbers of mobile terminals are assigned to RFID readers 110 built in the mobile terminals, based on the mobile communication network signal for synchronizing the mobile terminal with a base station, preferably, a synchronizing signal, an asynchronizing signal or any signal corresponding thereto, RFID readers 110 can be configured in such a manner that operating times according to detection of the tag 200 are different between readers.

Hereinafter, a method for minimizing interference between RFID readers built in mobile terminals according to an embodiment of the present invention will be described with reference to FIG. 2. Here, FIG. 2 schematically shows a flowchart for showing a method for minimizing interference between RFID readers according to an embodiment of the present invention.

First, when a plurality of mobile terminals 100 are scattered, wherein the mobile terminals include RFID readers 110 for detecting the tag 200 within several meters to scores of meters from a predetermined place in which one tag 200 is arranged, that is, a place where the tag 200 is located, each mobile terminal 100 detects both its own identity number and a mobile communication network signal for synchronizing the mobile terminal with a base station (S100). Preferably, a host MCU built in the mobile terminal detects both identity numbers of the mobile terminals, such as MDN, MIN, ESN, MSISDN, etc., for identifying the mobile terminals, and a mobile communication network signal whose cycle is constituted by a plurality of slots or frames arranged in time order.

The mobile terminal 100 then sequentially allocates identification numbers (0, 1, 2, ..., N−1) to a plurality of slots or frames arranged in time order, wherein the slots or frames constitute a cycle of the mobile communication network signal (S200).

Thereafter, the mobile terminal 100 divides the identity number of the mobile terminal 100 by the number (N) of basic information units constituting the cycle of the mobile communication network signal (S300).

After that, the mobile terminal 100 assigns the operating time of the RFID reader 110 to a particular basic information unit of the mobile communication network signal allocated the identification number identical to the remainder of the identity number of the mobile terminal 100, the identity number divided by the number of the basic information units (S400).

Finally, the RFID reader 110 minimizes interference between RFID readers by radiating an electromagnetic wave for detecting a specific tag for the assigned operating time (S500).

Industrial Applicability

In the present invention, it is possible to minimize interference between readers by scheduling operations of RFID readers mounted in a plurality of mobile terminals through a mobile communication network signal including a synchronous signal of an asynchronous signal, and by assigning an operating time specific to the mobile terminal at a specific point of time of the cycle of the mobile communication network signal according to an identity number of the mobile terminal, even when several readers are scattered in a predetermined area and they try to detect one tag at the same time. As the present invention provides use for services related thereto, marketing or business possibilities of the applied apparatus, and can be actually and clearly embodied, so it has industrial applicability.

The invention claimed is:

1. A method for minimizing interference of an RFID reader built in a mobile terminal, the method comprising the steps of:
   a) detecting an identity number of the mobile terminal and a mobile communication network signal for synchronizing the mobile terminal with a base station;
   b) allocating sequential identification numbers (0, 1, 2, ..., N−1) to basic information units constituting a cycle of the mobile communication network signal, the basic information units arranged in time order;
   c) dividing the identity number of the mobile terminal by the number (N) of basic information units constituting the cycle of the mobile communication network signal;
   d) assigning an operating time of the reader to a particular basic information unit of the mobile communication network signal allocated the identification number identical to a remainder of the identity number of the mobile terminal, the identity number divided by the number of the basic information units; and e) outputting an electromagnetic wave for detecting a specific tag for the assigned operating time.

2. The method of claim 1, wherein the identity number of the mobile terminal comprises any one of MDN, MIN, ESN, and MSISDN for identifying the mobile terminal.

3. The method of claim 1, wherein the cycle of the mobile communication network signal comprises a plurality of slots or frames arranged in time order.

4. A system for minimizing interference between RFID readers, the system detecting an identity number of a mobile terminal and a mobile communication network signal having a predetermined cycle for synchronizing the mobile terminal with a base station, assigning an operating time of an RFID reader built in the mobile terminal during a particular basic information unit among basic information units arranged in time order so as to constitute a cycle of the mobile communication network signal based on the identity number, and radiating an electromagnetic wave for detecting a tag only for the assigned operating time.

5. The system of claim 4, wherein the mobile terminal allocates sequential identification numbers $(0, 1, 2, \ldots, N-1)$ to basic information units arranged in time order, the basic information unit constituting a cycle of the mobile communication network signal, divides the identity number of the mobile terminal by the number (N) of basic information units constituting the cycle of the mobile communication network signal, and assigns the operating time to a particular basic information unit allocated the identification number identical to the remainder of the divided identity number of the mobile terminal.

6. The system of claim 4, wherein the identity number of the mobile terminal comprises one of MDN, MIN, ESN, and MSISDN for identifying the mobile terminal.

7. The system of claim 4, wherein the cycle of the mobile communication network signal is constituted by a plurality of slots or frames arranged in time order.

8. The system of claim 4, wherein the mobile terminal controls the operation of the RFID reader through a built-in host MCU.

\* \* \* \* \*